United States Patent Office 3,632,514
Patented Jan. 4, 1972

3,632,514
SAWDUST MATERIAL WITH QUATERNARY
AMMONIUM HALIDE ODOR-RETARDANT
Clarence J. Blocher, Wheaton, Ill., assignor to Frank
Miller & Sons, Inc., Chicago, Ill.
No Drawing. Filed Apr. 10, 1969, Ser. No. 815,227
Int. Cl. C09k 3/22
U.S. Cl. 252—88
10 Claims

ABSTRACT OF THE DISCLOSURE

Sawdust materials having odor-retardant properties characterized in that the particles of sawdust carry a small, but effective, amount of a quaternary ammonium compound, or a mixture of such compounds.

---

It is a common practice in meat and poultry processing plants, as well as in butcher shops, fish markets, and other establishments wherein such food products are handled and stored, to spread sawdust on the floor to take up natural fluids which normally drip from these products. However, sawdust has a serious shortcoming in that as it performs its absorbing function it becomes foul-smelling, a condition which requires that the sawdust be replaced at regular intervals, usually every twenty-four hours. The time, labor and material costs thus involved, even in a modest establishment, can take on significant proportions over an extended period.

In accordance with the present invention, there are provided sawdust materials, adapted to be spread on the floors of meat and poultry processing plants, or the like, which can retard and resist the development of malodors, and which, as a result, have a useful life severalfold that of conventional sawdust used for this purpose. The sawdust materials of this invention can be prepared and packaged with standard equipment, and any added costs incurred in their manufacture are effectively offset by their longer useful life.

In brief, the sawdust materials of this invention comprise sawdust, the particles of which carry a small, but effective, amount of an odor-retardant agent. The materials advantageously are prepared under substantially sterile conditions, and desirably are packaged in a manner to reduce the possibility of exposure to air-bore contaminants.

Generally speaking, the sawdust utilized in the preparation of the materials of this invention can be obtained from conventional sources thereof. While the water content of the sawdust particles is not critical, it should, initially, be at a level such that, after the particles have been contacted with the odor-retardant agent, they will remain essentially dry and will not cake or agglomerate to any appreciable extent. To this end, it is desirable to dry the sawdust in a kiln, or like heating device, or still better to use sawdust manufactured from kiln-dried lumber, in which case the water content of the particles of the sawdust, basis weight, will range from about 5% to about 20%, usually to about 8% to about 12%.

The odor-retardant agents used in the preparation of the sawdust materials of this invention are characterized in that they are capable of effectively retarding and resisting the development of malodors in the sawdust for substantial periods of time under the conditions and temperatures which prevail in meat, poultry and fish processing and handling establishments. Also, they are capable of achieving this result in a relatively low concentration, by weight, of the sawdust particles so as to be economically practical. In addition, they are characterized in that they do not, themselves, impart an offensive odor to the sawdust, and are safe to handle. Furthermore, they are compatible with the sawdust particles, and have a low sensitivity to organic matter such as grease, blood, and other animal fluids with which the particles commonly come into contact in said establishments.

The foregoing desiderata have been found to be met by quaternary ammonium compounds, particularly quaternary ammonium halides wherein at least one long chain alkyl group is attached to the nitrogen. Especially desirable are mixed alkyl, aryl quaternary ammonium chlorides containing one, or more, long chain alkyl groups, particularly predominately $C_{12}$–$C_{22}$ alkyl groups or mixtures thereof. Quaternary ammonium chlorides of this type are sold under the trademarks "Arquad" (Armour & Co.), "BTC" (Onyx Chemical Corporation) and "Hyamine" (Rohm & Haas). Mixtures of such chlorides also are available commercially, especially effective results being attained with the mixture of n-alkyl dimethyl benzyl ammonium chlorides sold under the trademark "BTC–2125" (Onyx Chemical Corporation). The mixture comprises n-alkyl (50% $C_{12}$, 30% $C_{14}$, 17% $C_{16}$, 3% $C_{18}$) dimethyl ethyl benzyl ammonium chloride, and n-alkyl (60% $C_{14}$, 30% $C_{16}$, 5% $C_{12}$, 5% $C_{18}$) dimethyl benzyl ammonium chloride. Exemplary of other quaternary ammonium compounds useful for the purposes of this invention are quaternary ammonium salts of alkyl pyridinium halides such as cetylpyridinium chloride, octylpyridinium chloride and the lauric acid ester of colaminoformyl methylpyridinium chloride; quaternary salts of sulfonamides exemplified by 2 - phenyl-3-p-sulfamido-phenyl-5-undecyltetrazolium chloride; and the like, and compatible mixtures thereof.

The amount of the quaternary ammonium compound incorporated into the sawdust particles is variable within reasonable limits. Generally speaking, effective results can be attained with loadings of the order of about 0.5% to about 3%, especially desirably from about 1% to about 1.5%, by weight, of the sawdust.

The quaternary ammonium compound advantageously is infused, impregnated or incorporated into the sawdust materials of this invention by applying, as by spraying or sprinkling, a solution of the compound onto the sawdust particles as they are being tumbled or mixed. The tumbling or mixing apparatus employed desirably is sterilized before the sawdust is placed in it, and the application of the compound to the sawdust particles preferably should take place just prior to packaging the product for shipment and sale to reduce the risk of exposure to air-borne contaminants.

As indicated, the quaternary ammonium compounds advantageously are applied in the form of solutions. From the standpoint of economy and ease in handling, it is preferred to employ aqueous solutions of the compounds. In order to provide a product having the aforementioned weight loadings of the agent, the compound should comprise from about 2% to about 10%, usually about 3% to about 5%, by weight, of the solution. The quantity of solution used, generally speaking, is such as to provide an increase in weight of the sawdust of from about 5% to about 10% over its initial weight. By utilizing solutions of the compound in amounts and concentrations indicated, drying of the end product can be effectively eliminated. Distribution of the solution on the sawdust particles can be aided, if desired, by the use of a surface tension lowering, or wetting, agent such as ethyl alcohol, or isopropyl alcohol.

The following examples are illustrative of particularly preferred embodiments of the present invention. They are, obviously, not to be construed as limitative of the invention since various other embodiments can readily be evolved in the light of the guiding principles and teachings provided herein.

EXAMPLE 1

300 pounds of a kiln dried sawdust, having a water content of approximately 10%, are placed in a pre-sterilized tumbler mixer. While the mixer is in operation, a solution comprising 3.6 pounds of a mixture of n-alkyl dimethyl benzyl ammonium chlorides (BTC 2125), (50% active), dissolved in 15 pounds of water, is sprayed into the mixer over a period of about 10 minutes. After all of the solution has been applied, the mixer is turned off and the resulting product is immediately packaged in 3-ply, air-tight multi-wall bags. A sample of the product was analyzed and found to comprise:

| Active ingredients: | Percent |
|---|---|
| n-Alkyl (50% $C_{12}$, 30% $C_{14}$, 17% $C_{16}$, 3% $C_{18}$) dimethyl ethyl benzyl ammonium chloride | .3 |
| n-Alkyl (60% $C_{14}$, 30% $C_{16}$, 5% $C_{12}$, 5% $C_{18}$) dimethyl benzyl ammonium chloride | .3 |
| Inert ingredients—Sawdust, moisture | 99.4 |
| | 100.0 |

EXAMPLE 2

250 pounds of kiln dried sawdust, having a water content of approximately 10%, are placed in a pre-sterilized tumbler mixer. While the mixer is in operation, a solution, comprising 3 pounds of N-(lauric acid ester of colaminoformylmethyl) pyridinium chloride and 15 cc. of ethyl alcohol in 12 pounds of water, is sprayed into the mixer over a period of 15 minutes. The final product is then bagged as in Example 1.

EXAMPLE 3

In determining the effectiveness of the sawdust materials of this invention in retarding or resisting odors, the sawdust prepared as described in Example 1 is compared with untreated sawdust under actual meat processing plant conditions. The results are set forth in the following table:

| Type of sawdust: | Observations |
|---|---|
| (1) Treated sawdust after 7 days on floor | No noticeable malodors detected. |
| (2) Untreated sawdust after 1 day on floor | Strong, easily detected, foul odor. |

What is claimed is:

1. An essentially dry sawdust material, adapted to be spread as a covering on the floors of meat, fish and poultry processing plants, or the like, which can retard and resist the development of malodors for a prolonged period of time, comprising sawdust, the particles of which carry a quaternary ammonium halide, or a mixture of such halides, in an amount effective to retard and resist the development of malodors for a prolonged period of time under the conditions and temperatures which prevail in meat, fish and poultry processing plants, or the like.

2. A sawdust material according to claim 1 wherein the amount of quaternary ammonium halide present comprises from about 0.5% to about 1.5%, by weight, of the sawdust material.

3. A sawdust material according to claim 1 wherein the sawdust has a water content, basis weight, of the order of about 5% to about 15%.

4. A sawdust material according to claim 1 wherein the quaternary ammonium halide contains at least one long-chain alkyl group.

5. A sawdust material as claimed in claim 1 wherein a mixture of quaternary ammonium halides is used, the material comprising, basis weight, about 0.3% n-alkyl (50% $C_{12}$, 30% $C_{14}$, 17% $C_{16}$, 3% $C_{18}$) dimethyl ethyl benzyl ammonium chloride, about 0.3% n-alkyl (60% $C_{14}$, 30% $C_{16}$, 5% $C_{12}$, 5% $C_{18}$) dimethyl benzyl ammonium chloride, and about 99.4% sawdust.

6. A method of preparing an essentially dry sawdust material, adapted to be spread as a covering on the floors of meat, fish and poultry processing plants, or the like, which can retard and resist the development of malodors for a prolonged period of time, comprising mixing sawdust particles under essentially sterile conditions with a solution containing a quaternary ammonium halide, or a mixture of such halides, to effect infusion, impregnation or incorporation into the sawdust particles of the halide, or mixture thereof, in an amount effective to retard and resist the development of malodors for a prolonged period of time under the conditions and temperatures which prevail in meat, fish and poultry processing plants, or the like.

7. A method as claimed in claim 6 wherein the mixing is carried out in a substantially sterilized mixer and the solution of quaternary ammonium halide is incrementally contacted with the particles of sawdust in the mixer.

8. A method as claimed in claim 6 wherein the solution of quaternary ammonium halide is in the form of an aqueous solution, the halide comprising from about 2% to about 10%, by weight, of the solution.

9. A method as claimed in claim 6 wherein the halide contains at least one long-chain alkyl group.

10. A method according to claim 6 wherein the sawdust particles are kiln-dried sawdust particles having a water content, basis weight, of the order of about 5% to about 15%.

References Cited

UNITED STATES PATENTS

| | | | |
|---|---|---|---|
| 1,916,163 | 6/1933 | Worth | 252—88 |
| 2,676,986 | 4/1954 | Wakeman | 424—76 X |
| 2,692,861 | 10/1954 | Weeks | 252—88 |
| 3,285,959 | 11/1966 | McFarlane | 424—76 |

JOHN T. GOOLKASIAN, Primary Examiner

M. E. McCAMISH, Assistant Examiner

U.S. Cl. X.R.

134—7; 424—76